April 12, 1949.  G. C. GENTRY ET AL  2,466,697
FEED MECHANISM FOR CARTRIDGE BELTS
Filed May 22, 1942  7 Sheets-Sheet 1
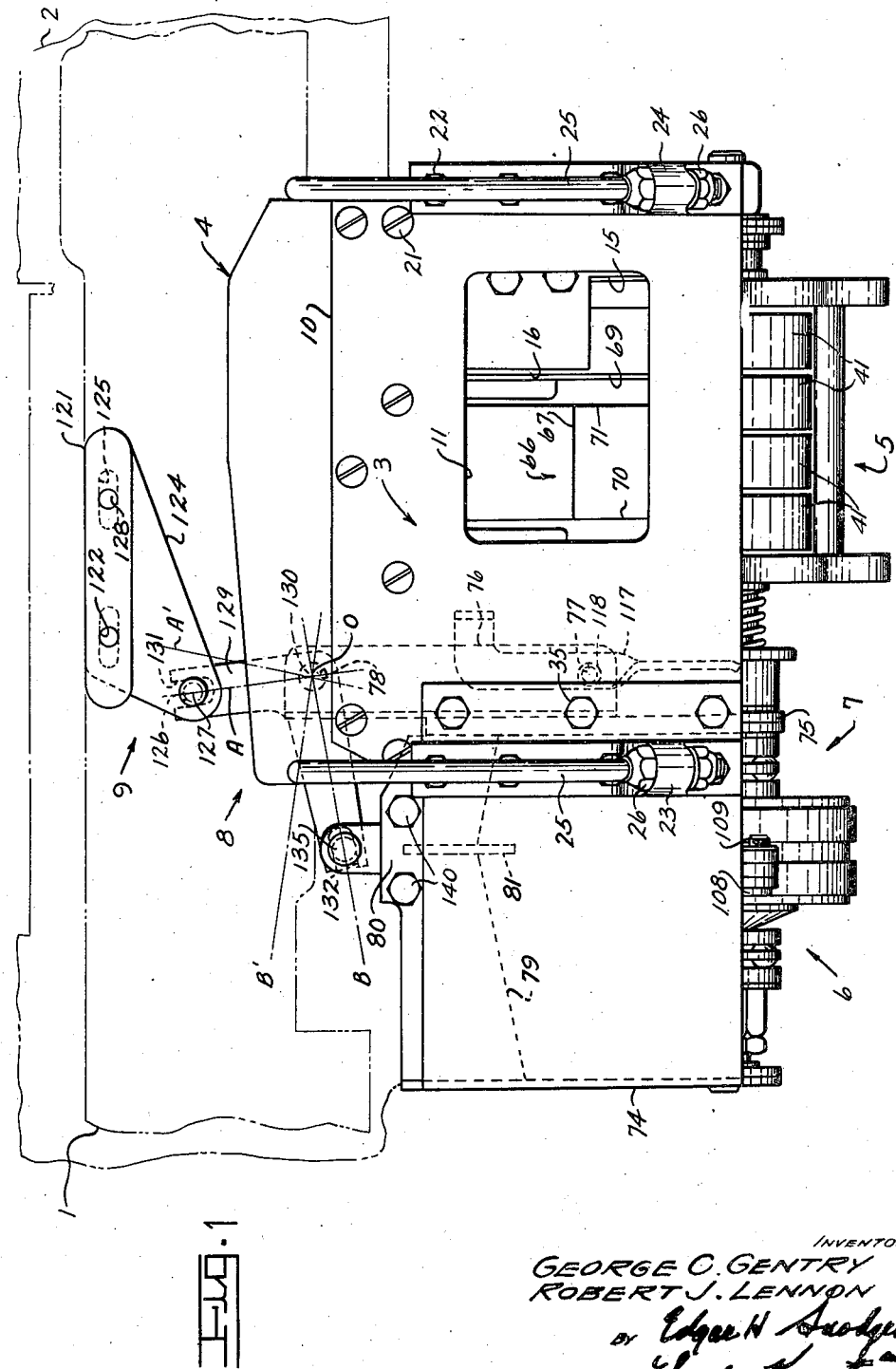
INVENTORS
GEORGE C. GENTRY
ROBERT J. LENNON April 12, 1949.  G. C. GENTRY ET AL  2,466,697
FEED MECHANISM FOR CARTRIDGE BELTS
Filed May 22, 1942  7 Sheets-Sheet 2
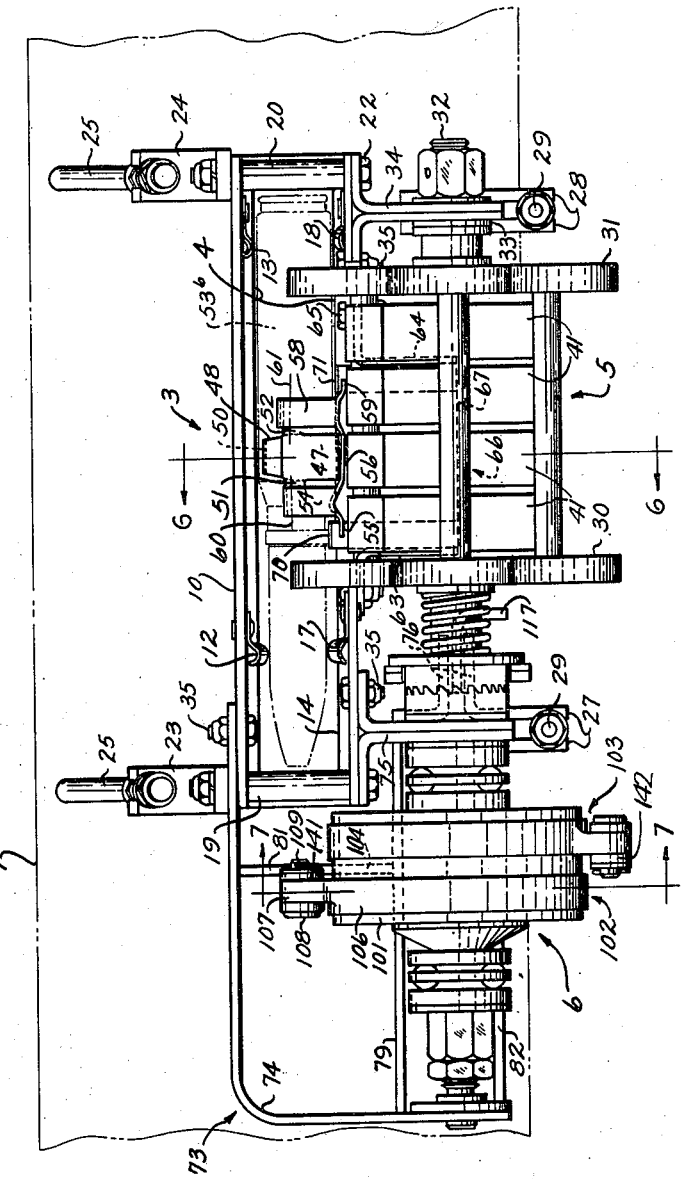
INVENTORS
GEORGE C. GENTRY
ROBERT J. LENNON
BY
ATTORNEYS April 12, 1949. G. C. GENTRY ET AL 2,466,697
FEED MECHANISM FOR CARTRIDGE BELTS
Filed May 22, 1942 7 Sheets-Sheet 3
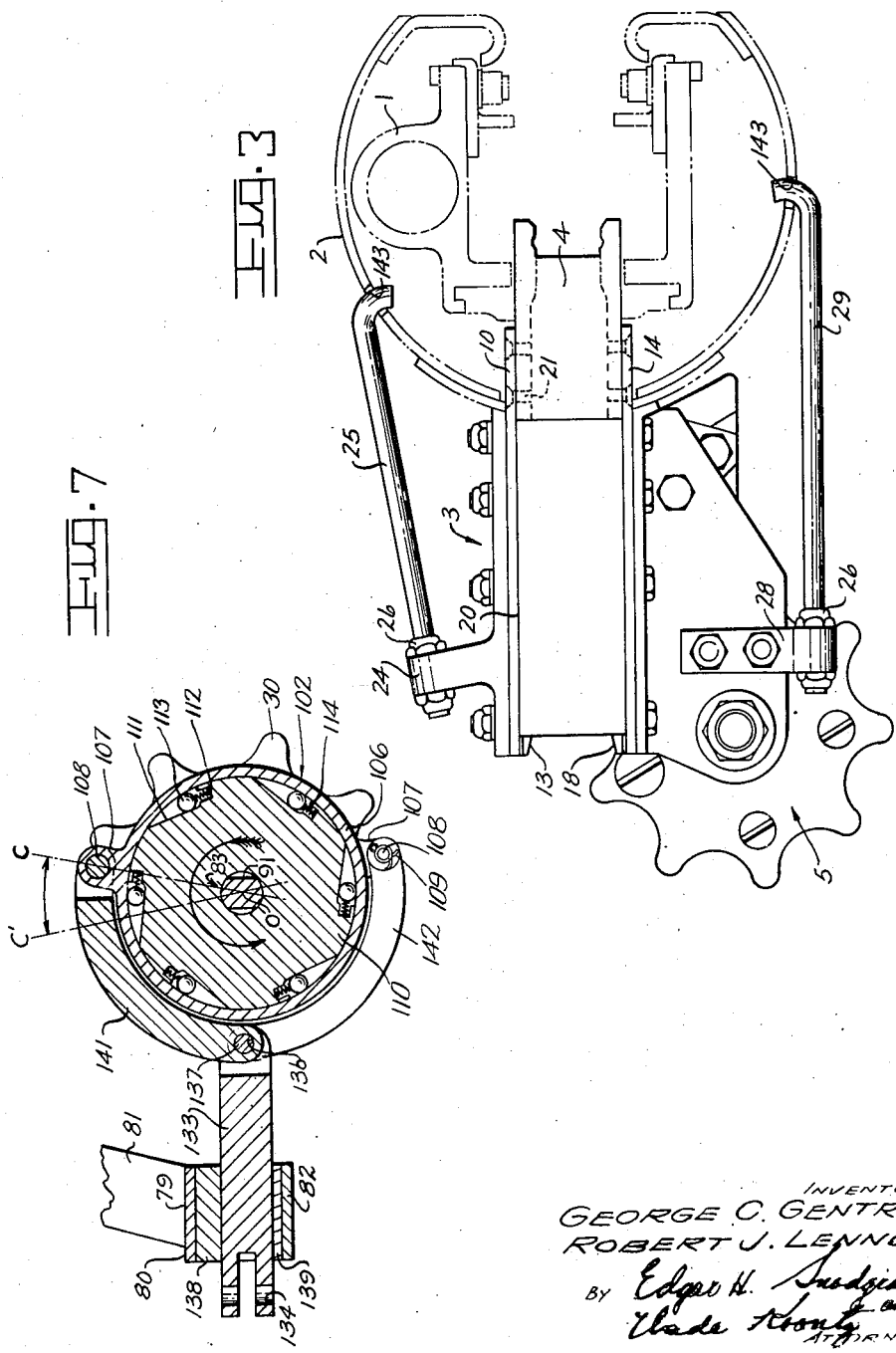
INVENTORS
GEORGE C. GENTRY
ROBERT J. LENNON
BY Edgar H. Snodgrass
and
Wade Koontz
ATTORNEYS

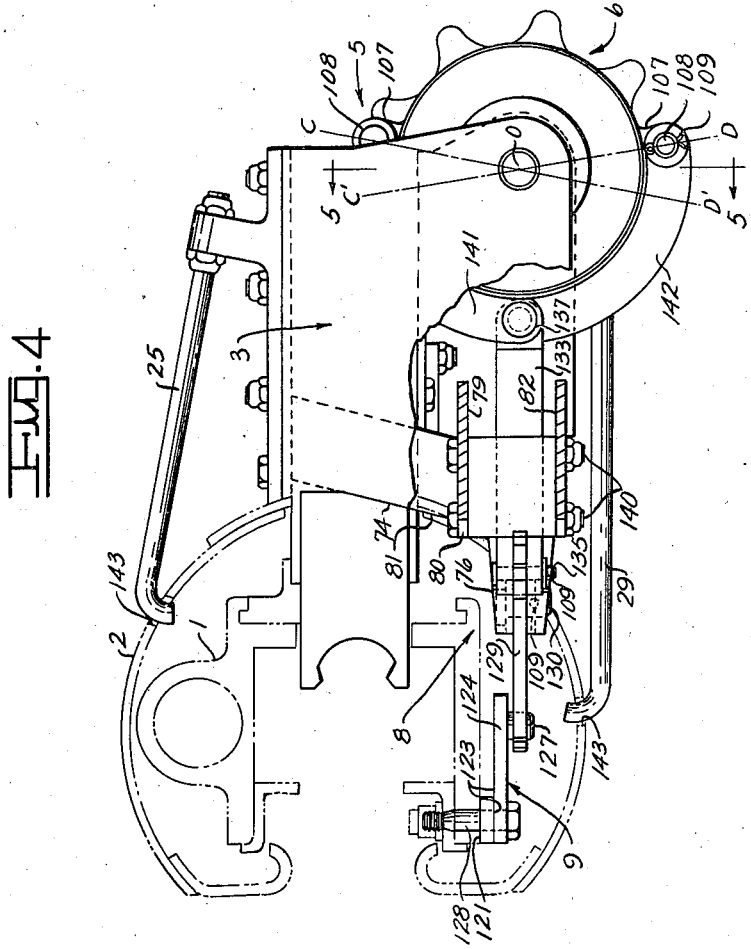

April 12, 1949.   G. C. GENTRY ET AL   2,466,697
FEED MECHANISM FOR CARTRIDGE BELTS
Filed May 22, 1942   7 Sheets-Sheet 5
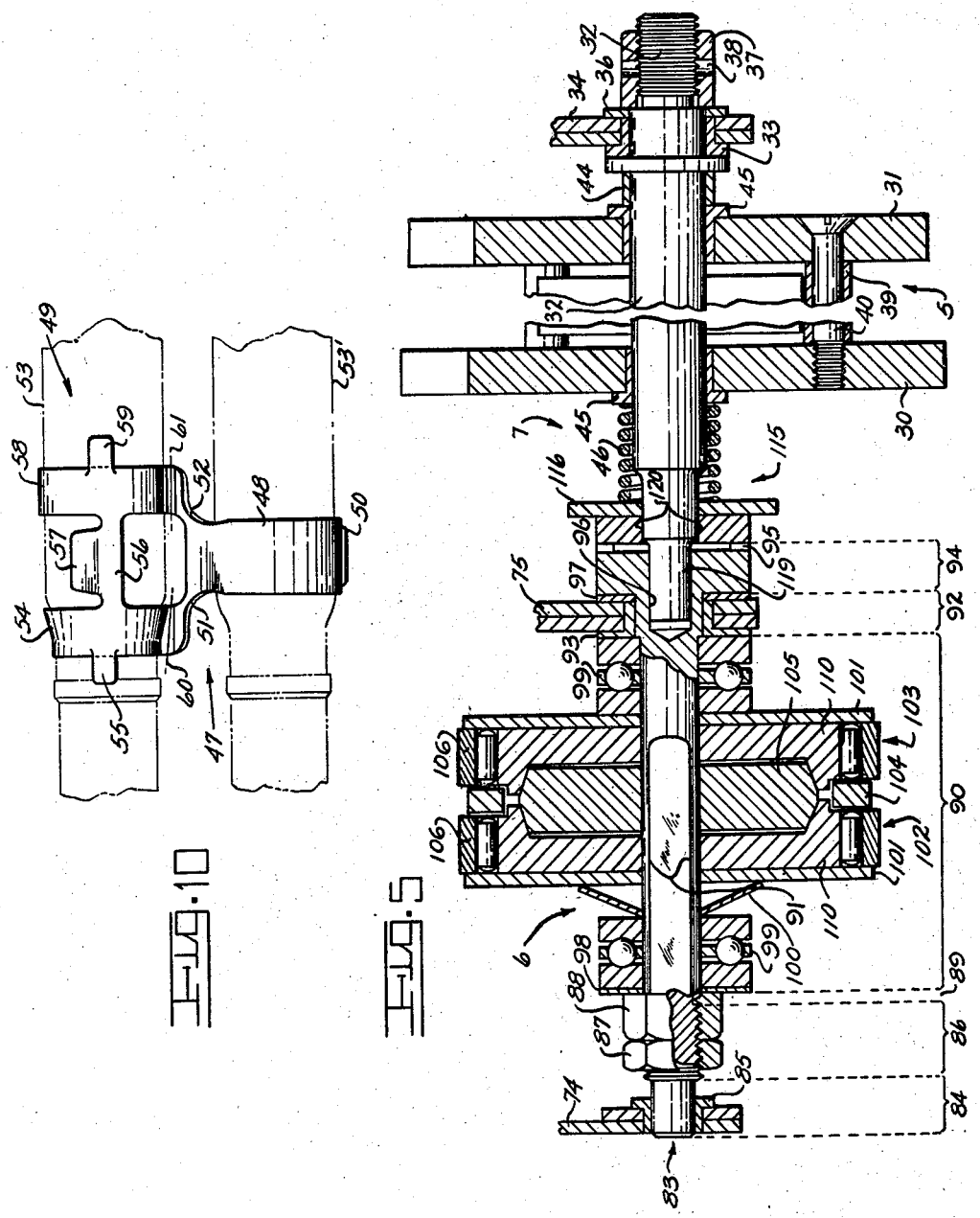
INVENTORS
GEORGE C. GENTRY
ROBERT J. LENNOR
BY
ATTORNEYS.

April 12, 1949.  G. C. GENTRY ET AL  2,466,697
FEED MECHANISM FOR CARTRIDGE BELTS
Filed May 22, 1942  7 Sheets-Sheet 6
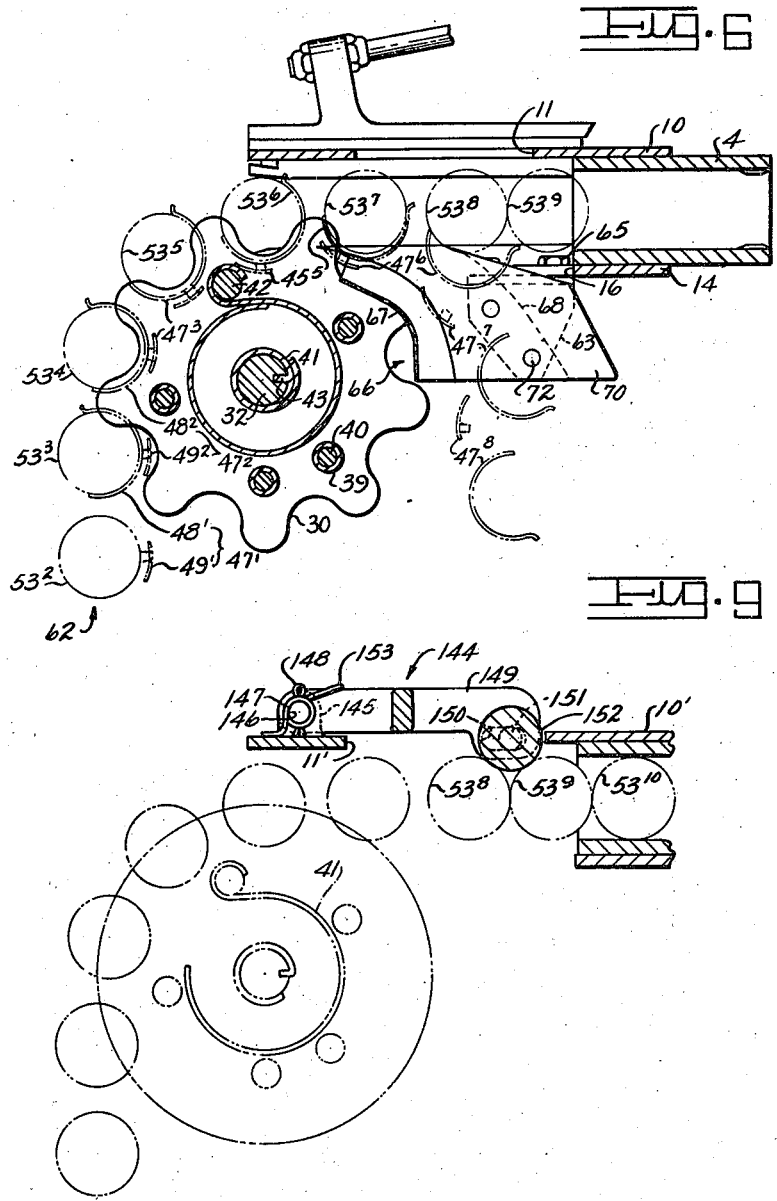
INVENTORS
GEORGE C. GENTRY
ROBERT J. LENNON
BY
ATTORNEYS April 12, 1949.　　　G. C. GENTRY ET AL　　　2,466,697
FEED MECHANISM FOR CARTRIDGE BELTS
Filed May 22, 1942　　　　　　　　　　　7 Sheets-Sheet 7
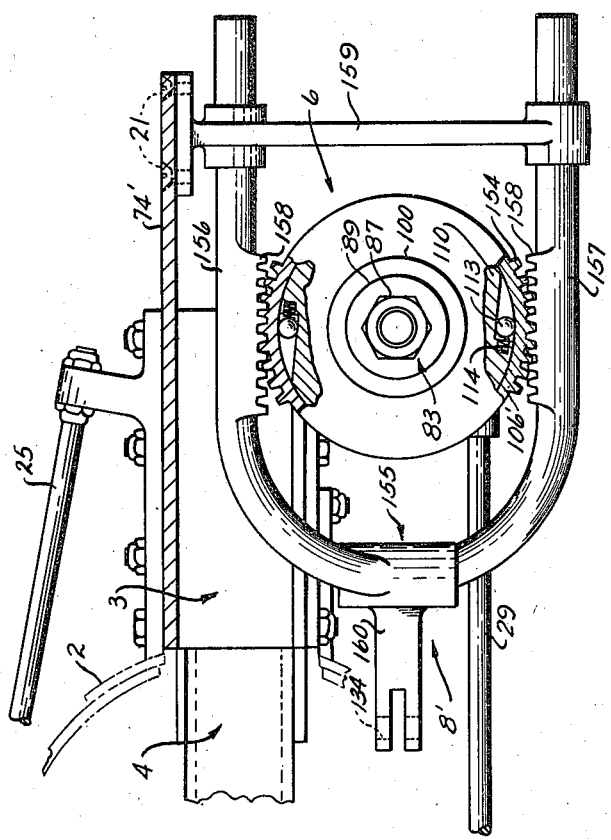
INVENTORS
GEORGE C. GENTRY
ROBERT J. LENNON Patented Apr. 12, 1949

2,466,697

UNITED STATES PATENT OFFICE 2,466,697

FEED MECHANISM FOR CARTRIDGE BELTS

George C. Gentry, Pittsburgh, Pa., and Robert J. Lennon, Moline, Ill.

Application May 22, 1942, Serial No. 444,157

9 Claims. (Cl. 89—33)

(Granted under the act of March 3, 1883, as amended April 30, 1928; 370 O. G. 757)

The invention described herein may be manufactured and used by or for Government for governmental purposes, without the payment to us of any royalty thereon.

This invention relates to cartridge belt feeding mechanisms actuated by the firing oscillations of automatic weapons.

It is a primary object of the invention to provide a booster mechanism wherein continuous rotation is derived from alternating linear motion induced by weapon recoil and counterrecoil.

Where cartridge belts must employ stripping clips, the invention further provides means for automatic clip removal upon predetermined feedway ingress.

The invention still further provides for the maintenance of a constant booster feeding pressure in all instances where cartridge belts employ stripping clips.

The invention still further provides for correct positioning of the unclipped or stripped cartridges in the feedway prior to bolt pickup.

With the foregoing and other objects in view, the invention resides in the novel arrangement and combinations of parts and in the details of construction hereinafter described and claimed, it being understood that changes in the precise embodiment of the invention herein disclosed may be made within the scope of what is claimed without departure from the spirit of the invention.

A practical embodiment of the invention, as applied to a twenty millimeter Hispano-Suiza (Birkigt) type 404 cannon, is illustrated in the accompanying drawings, wherein:

Fig. 1 is a top plan view of the improved feeding mechanism, including a phantom outline of the near cannon structure;

Fig. 2 is a side elevation of the feeding mechanism, including a phantom outline of the near cannon mount structure;

Fig. 3 shows a rear end view of the mechanism secured to a phantom cross-section of both cannon and mount;

Fig. 4 shows a front view of the mechanism secured to the phantom cross-section of Fig. 3, the inner lower corner of the leading plate portion being cut away to better show the feeding spool drive;

Fig. 5 is a sectional view taken on the line 5—5 of Fig. 4;

Fig. 6 is a sectional view taken on the line 6—6 of Fig. 2;

Fig. 7 is a sectional view taken on the line 7—7 of Fig. 2;

Fig. 8 shows a front view of a slightly modified form of feeding spool drive;

Fig. 9 shows a transverse sectional view of a stripped cartridge positioning means; and Fig. 10 is a bottom plan view of the stripping cartridge clip shown in side elevation in Fig. 2.

In the description which follows, we have elected to illustrate our invention as presently utilized by the Army Air Forces in connection with non-engine installations of the twenty millimeter Hispano-Suiza (Birkigt) type 404 cannon in aircraft. It therefore follows that ultimate distinction must be clearly drawn between broad application of our invention to automatic cannons and machine guns, in general, and the special application thereof described below. In the latter, care is taken to particularly point out parts arrangements exclusively required in connection with the type 404 cannon.

Referring jointly to Figs. 1, 2 and 4 of the drawings, the cannon structure adjacent to our feeding mechanism is represented by a phantom outline 1. As viewed in transverse section, the cannon outline 1 is completely surrounded as well as supported by a mount represented by a phantom outline 2. The principal sub-assemblies of our invention consist of a feed box 3, with outlet abutting a "through feedway" 4 which previously formed an essential part of a well known cylindrical type magazine extensively used in connection with the type 404 cannon; a "spring loaded" feeding spool 5, located immediately beneath the inlet of the feed box 3; a driving mechanism 6 in front of and coaxial with the feeding spool 5; a clutch 7 jointly coaxial with and interconnecting the feeding spool 5 and its driving mechanism 6; and a linkage 8 interconnecting the driving mechanism 6 with a bracket assembly 9 longitudinally adjustably secured to the under surface of the cannon outline 1.

As best illustrated in Figs. 1 through 3 of the drawings, the feed box 3 consists of a top 10 having an inspection opening 11 and to the bottom surface of which are riveted two parallelly disposed front and rear cartridge guides 12 and 13; of a bottom 14 having feeding spool and cartridge clip ejector cutouts 15 and 16 and to the top surface of which are riveted two parallelly disposed front and rear cartridge guides 17 and 18; of a front end 19; and of a rear end 20. It will be noted, in Figs. 1 and 3, that the inner overhanging ends of the feed box top 10 and bottom 14 are fixed to the outer half of the through feedway 4 by means of screws 21 and that their outer ends are fixed to the front and rear feed box ends 19 and 20 by means of bolts 22. As viewed in Fig. 3, the feed box 3 is readily detachably secured to the cannon mount represented by the phantom outline 2 by means of front and rear top brackets 23 and 24, including associated tie rods 25 and lock nuts 26; and front and rear bottom brackets 27 and 28 secured to later referred to spool supports, including associated tie rods 29 and lock nuts 26. If desired, four lock washers can be readily added beneath the four outermost (i. e., left hand) lock nuts 26. Description of the cartridge clip removing means fixed to the lower midportion of the feed box bottom 14 immediately follows description of its cofunctioning feeding spool 5.

As shown in Figs. 2, 3, 5 and 6 of the drawings, the "spring loaded" feeding spool 5 consists of a supporting shaft portion, a spool assembly portion, and a (spring) coupling portion therebetween. The first mentioned portion consists of a star wheel shaft 32, with rear end supported by a bushing 33 pressed into the outer lower extremity of a rear spool supporting bracket 34 fixed to the rear undersurface of the feed box bottom 14 by means of four previously mentioned bolts 22 and other bolts 35. The shaft 32 is held against longitudinal movement by means of a washer 36, a lock nut 37, and a staked pin 38. The second mentioned spool assembly portion consists of front and rear star wheels 30 and 31 fixed in the assembled showing of Figs. 5 and 6 by means of a plurality of spacer tubes 39 and cooperating screws 40. The last mentioned driving portion consists of a plurality of coil springs 41 and a driven pin 42, the latter being fixed to the aforesaid star wheels well outboard of their supporting shaft. The outer extremities of the coil springs 41 are looped fast to the driven pin 42, while their inner ends are inwardly turned in such manner that they rotationally fixedly engage a driving groove 43 provided in the star wheel shaft 32, Figure 6. While rendered substantially fixed against longitudinal movement through addition of a spacer collar 44, two inwardly pressed bushings 45, and a compression spring 46 of the clutch 7, as viewed in Fig. 5, the feeding spool 5 is free to lag behind clockwise rotation of its supporting shaft 32 until the four coil springs 41 have built up a "tight wound" total torque of 400 inch pounds. The aforesaid springs are further designed to deliver a total 145 degree unwound torque of 280 inch pounds.

The following forms an essential prelude to description of the cartridge clip removing means. Referring jointly to Figs. 2, 6 and 10 of the drawings, as viewed from the rear or trailing side and from the bottom plan, the stripping clip 47 consists of a leading (non-cartridge gripping) portion 48 and a trailing (cartridge gripping) portion 49. The portion 48 is of simple half-ring form with leading end terminating in an outwardly turned stop 50 and trailing end provided with forwardly and rearwardly projecting arms 51 and 52, respectively. Its inside diameter is slightly in excess of the outside case base diameter of the (partial) cartridge phantom outline 53' shown in Fig. 10 such that the former readily falls away from the latter under circumstances fully discussed below. The trailing portion 49 consists of a front half-ring 54, from the front midportion of which projects (and slightly depends) a front stripper lug 55 and from the rear midportion of which projects (and slightly depends) a tie piece 56 with a trailing projection 57; and of a rear half-ring 58, with front midportion joined to the tie piece 56 and from the rear midportion of which projects (and slightly depends) a rear stripper lug 59, the trailing portion 57 supporting the cartridge between the half-rings 54 and 58. As viewed in Fig. 10, the downwardly extending leading ends of the front and rear half-ring 54 and 58 are bent upwardly about the longitudinal axes 60 and 61, slightly less than 180 degrees, after which they project upwardly and blend into the forwardly and rearwardly projecting arms 51 and 52 of the leading portion 48. The inside diameters of the front and rear half-rings 54 and 58 are less than the outside diameters of the case bottleneck and case base of the (partial) cartridge 53 such that the former predeterminately grip the latter. The phantom cartridge belt 62 shown in Fig. 6 is formed by snapping the trailing edge portion 49' (only the tie piece 56 and trailing projection 57 of which are cut by section 6—6) of a phantom clip 47' over the case bottleneck and case base of a phantom cartridge $53^2$; by loosely cradling the forward end of the case base of a second phantom cartridge $53^3$ within the leading edge portion 48' (completely cut through by section 6—6) of the phantom clip 47' and thereafter "securing" the latter to the former by snapping the trailing edge portion $49^2$ of a second phantom clip $47^2$ over the case bottleneck and case base of the aforesaid second phantom cartridge $53^3$ (such that the two half-rings of $49^2$ straddle the single half-ring of 48'); and by thereafter repeating the above enumerated process for the remaining six phantom cartridges $53^4$ through $53^9$ and six phantom clips $47^3$ through $47^8$. In conclusion, it should be noted that although each trailing cartridge 53 and its attached stripping clip 47 can be freely rotated as a whole about the longitudinal axis of its preceding cartridge 53 through an angle closely approximating 180 degrees; the presence of the outwardly turned stop 50 upon the open ends of each clip leading portion 48, in combination with the presence of the leading edges of the tie pieces 56 of each clip trailing portion 49, positively prevents premature cartridge disengagement prior to contact with the clip removing means.

The cartridge clip stripper and deflector means can be best visualized by joint study of Figs. 1, 2, 6 and 10 of the drawings. As shown in the first three figures noted above, the front and rear edges of the cartridge clip cutout 16 provided in the feed box bottom 14 are supplied with flush front and rear angle brackets 63 and 64, fixed in place by means of bolts 65. The gap between the inturned surfaces of the angle brackets 63 and 64 is bridged by a cartridge clip deflector assembly 66, consisting of a depending deflector apron 67 supported by front and rear ends 68 and 69. The last named ends are clamped fast between the front and rear faces, respectively, of a front stripper 70 and a rear stripper 71 and the above mentioned inturned surfaces of the angle brackets 63 and 64 by means of screws 72. The outermost or leading edges of the front and rear strippers 70 and 71 are sharply tapered or wedge-shaped in form such that they are readily adapted to enter the two vertical gaps best indicated in Fig. 2 as existing between the top surface of the partially depending front stripper lug 55 and adjacent case bottleneck surface of the phantom cartridge $53^6$ and the top surface of the partially depending rear stripper lug 59 and adjacent case base surface of the phantom cartridge $53^6$. Thereafter; with continuing Fig. 6 advancement of the aforesaid phantom cartridge to the positioning of the sixth phantom cartridge $53^7$, then to the positioning of the seventh phantom cartridge 53⁸, then to the positioning of the eighth phantom cartridge 53⁹; the phantom outline of each succeeding clip 47⁶, 47⁷ and 47⁸ is indicated, respectively; firstly, as only slightly withdrawn such that its trailing two half-rings still partially grip the cartridge casing; secondly, as fully withdrawn such that its trailing two half-rings no longer grip the cartridge casing; and thirdly, as still more fully withdrawn such that the greater portion of its trailing two half-rings have now fallen clear of the cartridge clip deflector assembly 66. With departure of the two trailing half-rings from the casing of any advancing cartridge, the leading half-ring of the next (i. e., immediately following) cartridge is entirely free to fall away from the undersurfaces of the aforesaid advanced cartridge.

As a prelude to detailed description of the feeding spool driving mechanism 6, the clutch 7 and the linkage 8, it is felt desirable to deal briefly with a bracket 73 specially designed to simultaneously support the aforesaid three parts groupings. Referring jointly to Figs. 1, 2 and 4 of the drawings, the bracket 73 consists of an L-shaped cover and end plate 74 fixed to the front end of the feed box top 10 by means of the bolts 35; a front spool supporting bracket 75 fixed to the front end of the feed box bottom 14 by means of other bolts 35; two vertically separated and laterally disposed brackets 76 welded to the rear inner face of the front spool supporting bracket 75 and having an outer (ratchet release lever) clevis pin hole 77 and an inner (feed drive bellcrank) clevis pin hole 78; an upper (push rod guide) supporting plate 79 having its front and rear ends welded to the inner midportions of the plate 74 and the front spool supporting bracket 75 and its inner edge provided with a shallow inwardly projecting portion or boss 80; a slightly sloping and narrow vertical plate 81 with top and bottom ends welded, respectively, to the inner midbottom surface of the plate 74 and to the inner midtop surface of the upper supporting plate 79; and a lower (push rod guide) supporting plate 82 shaped like, attached like, and disposed parallel to the upper supporting plate 79.

As best illustrated in Figs. 2, 5 and 7 of the drawings, the feeding spool driving mechanism 6 is supported by and operates through a shaft 83 consisting of a front bearing portion 84, encased in a bushing 85; a threaded portion 86, carrying lock nuts 87 and 88; a narrow recess 89; a central portion 90 with oppositely disposed driving surfaces 91 (best shown in Fig. 7); a rear bearing portion 92 of slightly increased diameter, encased in a bushing 93; and a shoulder portion 94, the rear or open end of which is provided with twenty-four ratchet teeth 95 and a coaxially disposed pilot hole 96. If desired, a thrust washer 97 can be added between the front face of the shoulder portion 94 and the rear face of the front spool supporting bracket 75. The predetermined torque delivering portion of the feeding spool driving mechanism 6 is entirely confined to portions 86, 89 and 90 of the shaft 83. It consists of the previously referred to lock nuts 87 and 88; a thrust washer 98; front and rear thrust bearing 99; a conically formed spring washer 100; front and rear thrust collars 101; a front female cone assembly 102, with rearwardly facing cavity; a rear female cone assembly 103, with forwardly facing cavity; a ring shaped spacer 104 interposed between the outer (driving) portions of the female cone assemblies 102 and 103; and a double male cone 105 encased within the inner (driven) portions of the female cone assemblies 102 and 103. While free to slide longitudinally along the shaft 83, within the limits of the oppositely disposed driving faces 91, the double male cone 105 is fully fixed by the last mentioned faces against rotation with respect to the aforesaid shaft 83. The remaining parts 98 through 104 of the feeding spool driving mechanism 6 are merely journaled upon the shaft 83. The amount or degree of joint friction which the inwardly turned (right circular conical) surfaces of the driven female cones (102 and 103) can in turn impart to the outwardly turned surfaces of the double male cone (105) is regulated by longitudinal adjustment of the lock nuts 87 and 88.

Referring specifically to Figs. 2, 5, and 7 of the drawings, the front female cone assembly 102 comprises one complete (counterclockwise acting) silent ratchet mechanism consisting of a driving ring 106 provided with a clevis boss 107, a clevis pin 108 and a clevis cotter pin 109; a driven cone 110 (previously referred to as a "cone element") having its circumference provided with six equispaced wedge-shaped recesses 111, the butt or radially disposed end of each of which is provided with a spring recess 112; six rollers 113 (held against longitudinal escapement by the thrust collar 101 and the ring-shaped spacer 104 of Fig. 5); and six compression springs 114 for constantly urging the rollers 113 towards the converging ends of the wedge-shaped recesses 111.

While unessential to the obviously adequate present drawing disclosure, a lateral sectional view through the rear female cone assembly 103 would disclose an exact repetition of the parts showing of Fig. 7, with the single exception that the clevis boss 107 (and a later referred to link element of the linkage 8) would appear at the bottom of the assembly as shown in Fig. 4. It therefore follows that the rear cone assembly 103 constitutes a second (likewise counterclockwise acting) silent ratchet mechanism. The operation of the aforesaid ratchet mechanisms will be fully covered in connection with the description of the linkage 8.

As best illustrated in Figs. 1, 2 and 5 of the drawings, the clutch 7 is shown to consist of the previously described shoulder portion 94 of the shaft 83; a wheel shaft ratchet 115 having its front end provided with twenty-four ratchet teeth 95 adapted to mate with similar teeth located upon the rear end of the shaft 83 and its rear end provided with a "pushout" disk 116; a ratchet release lever 117 having its front inner portion pivotally secured between the inturned faces of the brackets 76 by means of a clevis pin 118 and the clevis cotter pin 109; and the previously mentioned clutch compression spring 46. It will be noted that the front end of the wheel shaft 32 is provided with a pilot 119, journaled within the pilot hole 96 provided in the rear end of the shaft 83, and with oppositely disposed driving surfaces 120. While free to slide longitudinally along the wheel shaft 32, within the limits of the oppositely disposed driving faces 120, the wheel shaft ratchet 115 is fully fixed by the last mentioned faces against rotation with respect to the aforesaid shaft 32. Usage of the clutch 7 is fully explained, below.

Construction and interaction of the bracket assembly 9 and the linkage 8 can be best understood by joint reference to Figs. 1, 4 and 7 of the drawings. The former consists of an elongated plate 121 having two reamed holes 122 therethrough and its undersurface provided with very finely spaced and laterally disposed teeth 123 thereacross; a second substantially triangular shaped plate 124 having two elongated holes 125 so constructed and arranged (with respect to the reamed holes 122) that it can be materially longitudinally adjusted with respect to the immediately overlaying elongated plate 121, the top surface of the aforesaid plate 124 being further provided with mating laterally disposed teeth 123 and the outer corner thereof being still further provided with a threaded hole 126; a pin 127 adapted to be screwed into the aforesaid hole 126 such that its smooth end thereafter depends therebeneath; and two bolts 128 whereby the plates 121 and 124 can be fixedly secured to the left-hand portion (as viewed in Fig. 4) of the undersurface of the phantom cannon outline 1. Once properly adjusted, the aforesaid bracket assembly remains permanently secured to that portion of the cannon under surface which recoils in firing. As viewed in Fig. 1, each cartridge explosion causes material right hand (i. e., rearward) movement of the phantom cannon outline 1 and its attached bracket assembly 9. The latter (linkage 8) consists of an L-shaped bellcrank 129 with its heel portion pivotally secured to the hole 78 provided in the inner end of the horizontal brackets 76 (welded to the rear inner face of the front spool supporting bracket 75) by means of a clevis pin 130 and retaining cotter pin 109 and its end portions provided with open pin slots 131 (for engaging the pin 127) and 132; a push rod 133 with its horizontally slotted inner end provided with a hole 134 for receiving a clevis pin 135 (engaged by the open pin slot 132) and retaining cotter pin 109 and its vertically disposed undercut outer end provided with a hole 136 for receiving a clevis pin 137 and retaining cotter pin 109; upper and lower push rod guides 138 and 139 fixed to the upper and lower supporting plates 79 and 82 by means of bolts 140; an upper arcuate link 141 having its lower extremity pivotally secured to the outer forward face of the push rod 133 by means of the clevis pin 137 and upper slotted extremity similarly secured to the driving ring clevis boss 107 (of the front ring) by means of the clevis pin 108; and a lower arcuate link 142 having its upper extremity pivotally secured to the outer rear face of the push rod 133 by means of the same clevis pin 137 and its lower slotted extremity similarly secured to the driving ring clevis boss 107 (of the rear ring) by means of another clevis pin 108. If desired, washers can be installed beneath the cotter pins 109 of the aforesaid clevis pins 130, 135, 137 and 108.

As a prelude to operation of the subassemblies 6 through 9, it should be noted that the driving mechanism 6, the clutch 7 and the linkage 8 form an integral part of and are attached directly to the feed box 3 and that the last named are readily brought into or removed from operable engagement with the bracket assembly 9 by attachment or removal of the hooked inner ends of the (upper front and rear) tie rods 25 and the (lower front and rear) tie rods 29 from four attaching holes 143 shown in Figs. 3 and 4 to be provided in the phantom outline 2 of the cannon mount. With each reassembly of the feed box 3, the open pin slot 131 (of the bellcrank 129) must be carefully aligned with the pin 127 (of the bracket assembly 9) prior to final attachment. It should also be noted, in Figs. 1 and 2, that the phantom outline 1 of the cannon is in its most forwardly position with respect to the phantom outline 2 of the cannon mount. Under such conditions, as viewed in Fig. 1, the dot-dash longitudinal axis OA of the inner arm of the bellcrank 129 has a decided forward cant or tilt with respect to "true lateral," resulting in corresponding outward cant or tilt of the dot-dash longitudinal axis OB of the outer arm (of the same bellcrank) from "true fore and aft." The aforesaid longitudinal axes positions result in counterpositioning of the upper and lower arcuate links 141 and 142 in the extreme right-hand placement of Figs. 4 and 7. Under such conditions, as viewed in Fig. 4, the dot-dash reference line OC (drawn through the longitudinal axes of the shaft 83 and the clevis pin 108) has a decided outward or right-hand tilt with respect to "true vertical." The significance of the aforesaid "positionings" will soon be apparent.

The cannon and mount are retained in the "normal" phantom 1 and 2 relationships of Figs. 1 and 2 by means of an adapter located a considerable distance (i. e., several feet) in advance of the cartridge feeding mechanism. As long as the cannon remains "inert," the aforesaid relationships continue. However, once "firing" commences, the cannon adapter permits marked right-hand or rearward movement of the cannon with respect to the mount, resulting in clockwise movements of the dot-dash longitudinal axes OA and OB of Fig. 1 into the new dot-dot-dash longitudinal axes positionings OA' and OB'. The aforesaid new axes positionings result in corresponding repositioning of the upper and lower arcuate links 141 and 142 approximately one and one-half link widths to the left hand of the present Fig. 4 and Fig. 7 placement. Under such conditions, the dot-dash reference line OC of Fig. 4 moves in a counterclockwise direction to the new dot-dash positioning OC', at which positioning the cannon adapter has completely absorbed rearward shock incident to cartridge discharge. Recoil energy stored within the adapter, as a result of cartridge discharge, thereafter automatically returns the cannon to the initial positioning of Figs. 1 and 2. The effect of alternate movement of the last mentioned reference line (from positioning OC to OC', then from positioning OC' to OC) upon the driving mechanism 6 is fully described below.

From the counterclockwise inclinations of the wedge-shaped recesses 111 of Fig. 7, in combination with the further fact that the rollers 113 are constantly being urged in the same counterclockwise direction by the compression springs 114, it is at once apparent that an infinitely small counterclockwise movement of the driving ring 106 is all that is required to cause counterclockwise rotation of the rollers 113 up the inclines 111 sufficiently to bring about complete fixation between the driving ring 106 and the driven cone 110. Therefore, during substantially all of its movement from position OC to position OC', the driving ring 106 is effecting counterclockwise movement of the driven cone 110. From the above, it is also equally apparent that following attainment of position OC', a like infinitely small clockwise movement of the driving ring 106 is all that is required to cause clockwise rotation of the rollers 113 down the incline 111 sufficiently to bring about complete removal of prior fixation existing between the driving ring 106 and the driven cone 110.

During return of the front and rear driving rings 106 to the initial position OC and OD shown in Fig. 4, two additionally important mechanical operations occur. Firstly, the front driven cone 110 is held in rotational fixity with respect to the double male cone 105 of Fig. 5 (during the entire period of driving ring return) through friction induced in their mating conical surfaces by the longitudinally acting thrust washer 98. Secondly, in returning from displaced position OD' to the initial position OD shown in Fig. 4, the rear driving ring 106 performs an exact duplication of the "work" performed by the front driving ring 106 in passing from the initial position OC of Fig. 7 to the displaced position OC'. It is thus readily apparent that applicants utilize countercoil, as well as recoil, of the cannon for the purpose of maintaining constant driving torque in their cartridge feeding mechanism.

The function of the clutch 7 becomes readily evident when "initial loading" of the cartridge belt 62 shown in Fig. 6 is considered in conjunction with the further showings of Figs. 2 and 5 of the drawings. As long as the cannon remains "inert," the shaft 83 of the driving mechanism 6 must also remain stationary. Thus, were the ratchet wheel shaft 32 of the feeding spool 5 fixedly coupled to the aforesaid shaft 83, the coiled springs 41 of Fig. 6 would completely counteract any attempt to accomplish initial insertion of the cartridge belt 62. However, through simple manipulation of the ratchet release level 117 of Figs. 1 and 2, the feeding spool 5 is rendered completely free to rotate in any desired direction and an armorer can readily "load" the shell belt 62 in the position indicated in Fig. 6.

In the previous description of Fig. 6 of the drawings, it is noted that on and after assuming the phantom position 53⁸, the cartridges of the belt 62 are completely freed from clip attachment. In passing from phantom position 53⁸ to phantom position 53⁹, each inwardly traveling cartridge 53 is still firmly grasped fore and aft by the front shell guides 12 and 17 and the rear shell guides 13 and 18 of Fig. 2. While the above arrangement should normally assure proper longitudinal alignment of the unclipped cartridges advancing through the "through feedway" 4, prior to bolt pickup, if desired a stripped cartridge positioning means 144 can be installed. In Fig. 9, a slightly modified feed box top 10' is provided with front and rear lever bosses 145 having their inwardly facing ends flush with the front and rear edges of an inspection opening 11' (identical in shape and placement to the inspection opening 11 of Fig. 1). Each of the aforesaid bosses is provided with a clevis pin hole 146, clevis pin 147 and clevis cotter pin 148 for pivotally securing the outer ends of an H-shaped lever 149. The slightly depending inner ends of the lever 149 are provided with laterally disposed slots 150 adapted to slidably engage and support two journals 151 provided in the front and rear ends of a roller 152. The last named is retained in pressure engagement with successively advancing pairs of cartridges 53 by means of two coil springs 153. It thus becomes readily apparent that two independent (though coacting) means are provided for the purpose of assuring continuously correct positioning of all cartridges which have progressed inwardly beyond the phantom cartridge positioning 53⁸ and are there awaiting bolt pickup.

Fig. 8 of the drawings shows a modified form of linkage 8' in which the front and rear driving rings 106, the upper and lower arcuate links 141 and 142, and the push rod 133 of Figs. 4 and 7 are replaced, respectively, by modified front and rear driving rings 106' incorporating short gear segments 154 in lieu of the previous clevis bosses 107 (best shown in Fig. 7); by upper and lower prongs 156 and 157, of a forked link 155, incorporating short racks 158 and slidingly guided by a depending support 159 fixed to the undersurface of a slightly modified cover and end plate 74' by means of screws 21; and by a base portion 160, of the forked link 155, having its inner end formed in a manner identical to formation of the inner end of the push rod 133. It will be noted that the upper, the vertical and the lower supporting plates 79, 81 and 82; the upper and lower push rod guides 138 and 139; and the four bolts 140 shown in Figs. 4 and 7 are not required in connection with the modified form of linkage 8' illustrated in Fig. 8. The linkages 8 and 8' both operate in identically the same manner.

At the commencement of the preceding description, it is stated that a clear distinction will be drawn between broad application of our invention to automatic cannons and machine guns installations and the special application thereof described above. Many parts disclosed above are exclusively related to type 404 cannon operation and for that reason are not essential to basic operation of our invention. Their presence is due principally to the fact that the aforesaid cannon has been heretofore serviced solely by such "spring loaded" cartridge magazines as the (French) Chatellerault cylindrical magazine, which is designed in such a manner that advancing cartridges are successively removed from their retaining clips prior to weapon entry, due to the fact that the bolt action of the type 404 cannon is unsuited for accomplishing normal cartridge clip release.

There are discussed below, in order of their original presentation, certain sub-assemblies and individual parts which can be either completely eliminated from basic consideration of our invention or for which much simpler structures can be substituted in connection therewith. Referring to Figs. 1 through 3 of the drawings, the feed box 3 can be greatly simplified for the average machine gun installation by elimination of the cartridge guides 12, 13, 17 and 18; and the "through feedway" 4 (previously noted as taken from the Chatellerault magazine). As best seen in Figs. 5 and 6, the feeding spool 5 can be materially simplified by complete elimination of the four coil springs 41 (providing the "spring loaded" feature referred to in the preceding paragraph) and by substituting therefor rotational fixity between the front and rear star wheels 30 and 31 and their supporting shaft 32. Referring to Figs. 2 and 3, the feed box attaching parts 25 through 29 relate exclusively to a type 404 cannon installation.

The cartridge clip 47 shown in Figs. 2 and 10 of the drawings; as well as the cartridge clip "stripper" parts 70 through 73 of Figs. 1, 2 and 6; pertain solely to the type 404 cannon. In the average machine gun installation, our invention can employ any one of several widely utilized metal cartridge clips. While still retaining its present L-shaped form, the "arm lengths" and "pivot point" of the bellcrank 129 (of the linkage 8 shown in Figs. 1 and 4) must be obviously varied to suit the recoil working limits of each separate automatic cannon or machine gun installation to which applied. The structural form of the bracket assembly 9 (associated with the above referred to linkage 8) will vary widely with each new automatic cannon or machine gun installation. The cartridge positioning means shown in Fig. 9 pertains exclusively to the type 404 cannon installation and can therefore be eliminated from broad usage of our invention.

Although the descriptions of this specification are mainly specific to the type 404 cannon installation illustrated in Figs. 1 through 10 of the drawings, or readily understood modifications thereof, it is to be understood that there can be departures therefrom, both with respect to narrow type 404 cannon application and to general automatic cannon and machine gun usage, which will still clearly fall within the field and scope of the subject invention, and we therefore do not wish to be restricted thereto, but only in so far as the appended claims are so limited.

Having thus described our invention, what we claim as new and desire to secure by Letters Patent of the United States is:

1. A cartridge belt feed mechanism for an automatic gun having parts subject to movement during recoil and counterrecoil, comprising a frame, a driving shaft and a driven shaft coaxially mounted for rotation in said frame, a cartridge feed spool rotatably and non-slidably mounted on said driven shaft, a clutch connecting the adjacent ends of said shafts, manually operable means for disconnecting said clutch, driving means for said driving shaft comprising an inner friction member non-rotatably mounted thereon, outer friction members rotatably mounted on said driving shaft in frictional contact with said inner member, oscillatable driving rings surrounding said outer members, clutch means between said rings and said outer members constructed and arranged to drive said outer members solely in one direction upon the oscillation of said driving rings, a linkage interposed between the moving parts of the gun and said rings for actuating the latter upon recoil and counterrecoil of the gun, and a yielding torque transmitting connection between said driven shaft and said spool for rotating the latter in the direction of rotation of said driving shaft.

2. A feed mechanism as set forth in claim 1, including a plurality of plates rotatably mounted on said driving shaft in engagement with the outer faces of said outer friction members, and a spring washer engaging at least one of said plates, and having adjustable means operatively associated therewith for varying the tension of said washer to vary the pressure between the surfaces of said friction members.

3. In a cartridge belt feed mechanism for an automatic gun having a part subject to movement in recoil and counterrecoil, a frame, a driving shaft and a driven shaft coaxially mounted for joint and independent movement in said frame, a cartridge feed spool rotatably and non-slidably mounted on said driven shaft, a clutch adapted to connect the adjacent ends of said shafts and including a clutch element carried by each shaft, driving connections between said driven shaft and its associated clutch element, a spiral spring interposed between said driven shaft element and said feed spool for transmitting torque to said spool, a friction disc non-rotatably mounted on said driving shaft, oppositely disposed friction members rotatably mounted on said driving shaft in frictional engagement with said friction disc, one-way clutch devices carried in the periphery of said friction members oscillatable driving rings, means operatively connecting said rings to the aforesaid gun part, said rings surrounding said members and coacting with said clutch devices to rotate said members in one direction, both upon recoil and counterrecoil of the gun part, and a linkage interposed between said rings and the gun part for actuating said rings to drive said shafts through said friction disc.

4. In a belt feed mechanism for an automatic gun having a part subject to movement during recoil and counterrecoil, a frame including a shaft journaled therein, a feed spool rotatably and non-slidably mounted on said shaft, torque-transmitting means connecting said feed spool and shaft, a friction disc non-rotatably mounted on said shaft, driving members rotatably mounted on said shaft in frictional engagement with said disc, a plurality of clutch devices mounted in the peripheries of said members, oscillatable drive rings coacting with said devices to drive said members, a push rod slidably mounted in said frame, a plurality of links pivotally connected with said rod and with said driving rings whereby when the push rod is reciprocated said driving rings will be oscillated, said clutch devices cooperating with said rings to drive said shaft through said friction disc, a bell crank pivoted to said frame and having one arm pivoted to said push rod and the other to the movable part of the gun whereby said push rod is reciprocated upon recoil and counterrecoil of the gun.

5. In a cartridge belt feed mechainsm for an automatic gun adapted to reciprocate in recoil and counterrecoil, a cartridge spool rotatable to feed cartridges to said gun, a driving mechanism for said cartridge feed spool including a frame, a driving shaft mounted in said frame and having members thereon through which said shaft is driven, a plurality of oscillatable driving rings, one surrounding each of said members and each being provided with pinion segments, clutch devices between said members and said rings and cooperating therewith to drive said members intermittently in one direction upon the oscillation of said rings, a yoke shaped member slidingly supported in said frame and having a rack on each of its arms in engagement respectively with said pinion segments, a linkage operatively engaging said yoke-shaped member and adapted to engage the said gun and constructed and arranged to transmit reciprocating motion due to said recoil and counterrecoil to said yoke-shaped member to thereby oscillate said rings.

6. In a self-loading weapon having a support fixed against recoil and counterrecoil and a barrel movable with respect to the support in recoil and counterrecoil, an ammunition feeding device comprising a main carrying structure adapted to be secured to the support, a first shaft journaled in said structure, a second shaft journaled in said structure coaxial with and adapted to be driven by said first shaft, a clutch interposed between said first and said second shafts, resilient yielding means mounted on at least one of said shafts and normally operative to urge said clutch into positive driving engagement, manually operable means for positively disengaging said clutch, ammunition engaging means operatively connected to said second shaft, a resilient lost motion connection interposed between said last-named means and said second shaft for transmitting torque therebetween, and means responsive to both recoil and counterrecoil of the barrel, and having an element for imparting unidirectional rotation to said first shaft during substantially the entire recoil of the barrel, and having a second element for imparting further rotation in the same direction to said first shaft during substantially the entire counterrecoil of the barrel.

7. In a self-loading weapon having a support fixed against recoil and counterrecoil and a barrel movable with respect to the support in recoil and counterrecoil, an ammunition feeding device comprising a main carrying structure adapted to be secured to the support, a first shaft journaled in said structure, a second shaft journaled in said structure coaxial with and adapted to be driven by said first shaft, a clutch interposed between said first and said second shafts, ammunition engaging means operatively connected to said second shaft, and means responsive to both recoil and counterrecoil of the barrel, and having an element for imparting unidirectional rotation to said first shaft during substantially the entire recoil of the barrel, and having a second element for imparting further rotation in the same direction to said first shaft during substantially the entire counterrecoil of the barrel.

8. In a self-loading weapon having a support fixed against recoil and counterrecoil and a barrel movable with respect to the support in recoil and counterrecoil, an ammunition feeding device comprising a main carrying structure adapted to be secured to the support, a first shaft journaled in said structure, a second shaft journaled in said structure coaxial with said first shaft, means connectible between said shafts for the driving by said first shaft of said second shaft, ammunition engaging means operatively connected to said second shaft, means responsive to both recoil and counterrecoil of the barrel and constructed and arranged whereby to impart unidirectional rotational movement to said first shaft during substantially the entire movement of the barrel in recoil and counterrecoil, said last-named means comprising an inner member secured to said first shaft and having a plurality of frictional driving surfaces, a plurality of outer members rotatably mounted on said first shaft, each of said outer members having at least one surface adapted to frictionally engage a driving surface of said inner member and including a plurality of unidirectional clutches in its periphery, a plurality of driving rings operatively associated with said unidirectional clutches for driving said inner and outer members in one direction, and a linkage interconnecting said driving rings and at least the gun barrel, said linkage including a bracket mounted on the barrel, and means for adjustably positioning said bracket on the barrel for regulating the feeding of ammunition to said weapon.

9. In a self-loading automatic weapon having a fixed part and a relatively movable part thereon, an ammunition feeding device comprising a main supporting structure adapted to be secured to said relatively fixed part, shaft means rotatably mounted in said supporting structure, ammunition engaging and feeding means operatively connected to said shaft means, means responsive to relative motion in opposite directions between said fixed and movable parts and constructed and arranged whereby to impart unidirectional rotational movement to said shaft means during substantially the entire movement of said relatively movable parts in said opposite directions, and a bracket adjustably mounted on said relatively movable part, said relative motion responsive means including a linkage operatively associated with said bracket and with said shaft means for transmitting motion therebetween and including an element for imparting unidirectional rotation to said shaft means during substantially the entire recoil of the barrel and including a second element for imparting further rotation in the same direction to said shaft means during substantially the entire counterrecoil of the barrel.

GEORGE C. GENTRY.
ROBERT J. LENNON.

REFERENCES CITED

The following references are of record in the file of this patent:

UNITED STATES PATENTS

| Number | Name | Date |
| --- | --- | --- |
| 863,101 | Schwarzlose | Aug. 13, 1907 |
| 1,178,624 | Candelon | Apr. 11, 1916 |
| 1,399,440 | Payne | Dec. 6, 1921 |
| 1,692,328 | Browning | Nov. 20, 1928 |
| 1,842,446 | Dabrasky | Jan. 26, 1932 |
| 2,222,812 | Faulkner et al. | Nov. 26, 1940 |
| 2,366,395 | Hall | Jan. 2, 1945 |
| 2,375,219 | Gentry et al. | May 8, 1945 |
| 2,375,452 | Webb | May 8, 1945 |
| 2,377,828 | Trotter et al. | June 5, 1945 |

FOREIGN PATENTS

| Number | Country | Date |
| --- | --- | --- |
| 2,332 | Great Britain | 1914 |
| 19,641 | Great Britain | 1906 |
| 193,950 | Switzerland | Feb. 1, 1938 |
| 310,179 | Germany | Dec. 13, 1919 |
| 323,401 | Germany | July 24, 1920 |
| 355,767 | France | Feb. 21, 1930 |
| 492,774 | France | Apr. 2, 1919 |
| 706,160 | Germany | May 19, 1941 |